A. BUONICORE.
CUSHION SHACKLE.
APPLICATION FILED DEC. 7, 1912.
1,104,343.
Patented July 21, 1914.
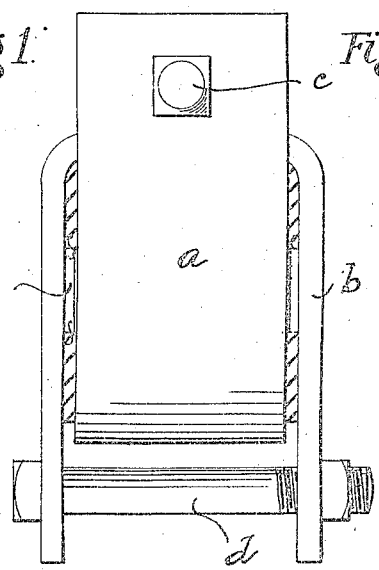
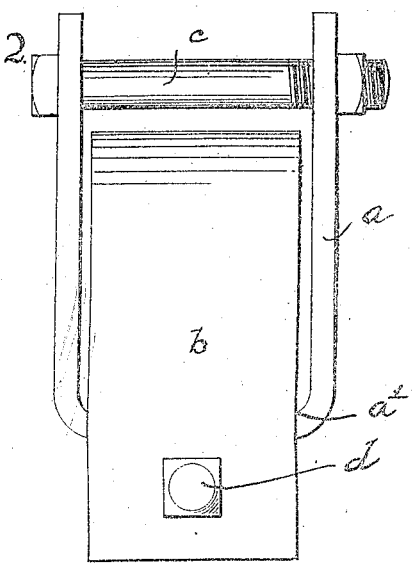
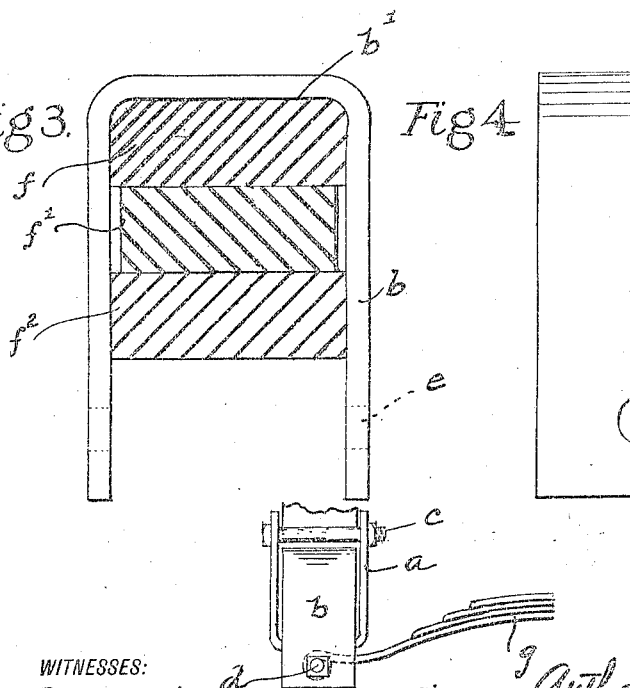
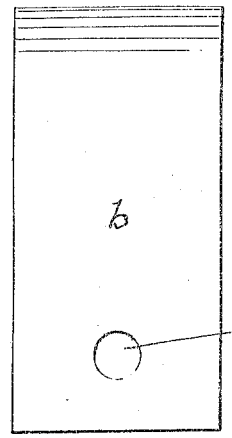

UNITED STATES PATENT OFFICE.

ANTHONY BUONICORE, OF NEW YORK, N. Y.

CUSHION-SHACKLE.

1,104,343.　　　Specification of Letters Patent.　　Patented July 21, 1914.

Application filed December 7, 1912. Serial No. 735,515.

*To all whom it may concern:*

Be it known that I, ANTHONY BUONICORE, a citizen of the United States, residing in the borough of Bronx, in the city, county, and State of New York, have invented certain new and useful Improvements in Cushion-Shackles, of which the following is a specification, reference being had therein to the accompanying drawings, which form a part thereof.

My invention relates to cushion shackles, and more particularly to a type thereof especially adapted for use upon vehicles.

The main object of the invention is to provide a shackle adapted for arrangement between a vehicle spring and the vehicle body, which shackle will embody therein a cushion element which will absorb vibrations to an extent to increase the comfort of the occupants of the vehicle.

A further object is to provide a shackle of this character which in addition to giving the desired cushioning effect, will be capable of yielding at widely divergent points thereof to compensate for lateral or longitudinal movement of the vehicle body, as well as vertical movement thereof, thus affording universal movement between the different elements of the shackle without undue wear thereon, or resultant noise.

A still further object is to provide a shackle which will be capable of absorbing the shocks and vibrations to an extent to permit the use of tires which are not highly resilient. And a still further object is to provide a shackle of this character which will be simple in design and economical to produce.

The invention consists primarily in a cushion shackle embodying therein a member adapted to be carried by the running gear of a vehicle, a load carrying member nested therein and adapted to sustain the load of the body, each of said elements presenting an extended bearing surface oppositely disposed to the bearing surface of the other, and a resilient cushion seated between said bearing surfaces whereby the vibrations of said running gear element are absorbed by said cushion; and in such other novel features of construction and combination of parts as are hereinafter set forth and described, and more particularly pointed out in the claims hereto appended.

Referring to the drawings:—Figure 1 is a side elevation of a shackle embodying my invention; Fig. 2 is a front view thereof; Fig. 3 is a front elevation of one of the load carrying elements; Fig. 4 is a side elevation thereof; and Fig. 5 is a detail view of one end of a pair of wagon springs having my shackle applied thereto.

Like letters refer to like parts throughout the several views.

In the embodiment of my invention shown in the drawings, I have shown at $a$ a metallic element, preferably U-shaped and having adjacent the top thereof transverse openings adapted to receive a bolt $c$ by means of which the element may be attached to the ordinary semi-elliptic spring forming a part of the running gear of a vehicle.

Nested within the element $a$ is a similar element $b$ having adjacent to its ends bolt holes $e$ adapted to receive a bolt $d$ by means of which the element $b$ may be connected to a member interposed between it and the vehicle body, such as the semi-elliptic spring $g$. The elements $a$ and $b$ are of such dimensions that when nested as shown one will not engage the other, thus not only avoiding any rattling, but also affording unrestricted movement of these parts. The elements $a$ and $b$ present parallel bearing surfaces as $a'$ $b'$ extending at right angles to the normal line of stress thereon, and seated between these bearing surfaces is a rubber cushion, preferably comprising three elements, $f$ $f'$ and $f^2$, the middle one of which is narrower than the others in order to permit a yielding of this cushion at the sides with lateral swaying of the vehicle body. The loops or elements $a$ and $b$ are nested one within the other, and the sole bearing between these elements is through the rubber cushion so that in the movement of one of these elements relative to the other there is no grinding or wear, and no noise.

In a vehicle equipped with my improved shackle, the entire load of the body is normally sustained by the cushion $f$ $f'$ $f^2$, and is transmitted therethrough to the vehicle springs, the return movement of the vehicle springs of the running gear after compression from shocks, due to roughness of the road, being largely absorbed, thereby preventing the transmission of vibrations resulting from such shocks, to the vehicle body. The weakening of the cushion at the end will permit a comparatively free tilting of the element $b$ within and relative to the element $a$, and I preferably use this construction in order to avoid as much as possible, interference with this tilting action. When tilting, the line of stress will be diagonally through the cushion upwardly and downwardly, thus causing the main stresses, when the device is tilted, to be substantially through the center of the section $f'$ of the cushion element.

The manner of applying the shackle to a vehicle is immaterial, and will vary according to the character of the running gear employed in such vehicle.

In Fig. 5 of the drawings, I have shown my shackle applied to the rear springs of a light vehicle, in which a semi-elliptical spring is interposed between the vehicle body and the shackle. Any other desired connection between the shackle and the vehicle body may be employed, however, and the specific form of connecting means is immaterial to my invention which consists more particularly in the form of shackle used.

In the continued practice of my invention upon a light vehicle having ordinary metallic tires, I have found that the shocks and vibrations have been absorbed or minimized to an extent to cause said vehicle to ride with an ease apparently equal to that of an ordinary solid rubber tired vehicle, but without the vibrations which are found in such vehicles. In other words, as between a vehicle equipped with the ordinary solid rubber tires and a vehicle equipped with my cushion shackle, the latter, in actual practice, more nearly approaches the conditions found with the ordinary pneumatic tires.

When using cushion tires, many vibrations pass to the vehicle body and any vibrations developed in the springs or elsewhere are transmitted directly to the vehicle body. With a cushion shackle made in accordance with my invention, however, the vibrations which must necessarily be developed in the running gear are absorbed by the connection between this running gear and the vehicle body to an extent to limit the movement of the vehicle body in large measure to the yielding of the springs, residuary vibrations or shocks being entirely eliminated. At the same time, the different elements of the shackle have unrestricted freedom of movement relative to each other so as to permit the swaying of the vehicle body, the cushion member between these elements, however, serving to check this swaying movement slightly, while at the same time presenting an anti-friction, noiseless element between the two elements.

By making the cushion member $f'$ of smaller dimensions laterally than the two other elements of the cushion, the sides of the cushion are weakened so as to offer less resistance to lateral oscillations of the element $b$, thus permitting such oscillations, while at the same time preserving the maximum cushioning strength so far as the vertical stresses upon the shackle are concerned.

It is not my intention to limit the invention to the precise details of construction shown in the drawings, nor to the manner of connecting the shackle to the running gear, and to the vehicle body, it being apparent that such may be varied without departing from the spirit and scope of the invention.

While primarily my improved shackle is especially adapted for use in connecting a vehicle body with the running gear, I do not desire to limit myself to its use in this connection, as it may be used with satisfactory results in supporting objects other than vehicle bodies.

Having described my invention, what I claim as new and desire to have protected by Letters Patent, is:—

1. A cushion shackle embodying therein a plurality of similar metallic elements, each having flat parallel sides and a flat connecting bearing surface, said elements having a sliding fit one within the other with the sides of one element occupying parallel planes perpendicular to the sides of the other, the ends of the sides of each element projecting beyond the bearing surface of the other, and the edges of the sides of one of them projecting in juxtaposition to the surface of the other whereby a substantially inclosed chamber having top and bottom bearing surfaces is formed, and a resilient cushion, seated within said chamber between said bearing surfaces, said elements respectively being provided with means whereby one of them may be secured to one part, and the other may be secured to a relatively movable part.

2. A cushion shackle embodying therein a plurality of similar metallic elements, each having flat parallel sides and a flat connecting bearing surface, said elements having a sliding fit one within the other with the sides of one element occupying parallel planes perpendicular to the sides of the other, the ends of the sides of each element projecting beyond the bearing surface of the other, and the edges of the sides of one of them projecting in juxtaposition to the surface of the other whereby a substantially inclosed chamber having top and bottom bearing surfaces is formed, and a resilient cushion, seated within and conforming to, said chamber between said bearing surfaces, said elements respectively being provided with means whereby one of them may be secured to one part, and the other may be secured to a relatively movable part, and said cushion being weakened adjacent the sides of said first named element, whereby oscillatory movement of said element is permitted, and movement or displacement of said cushion is prevented.

3. A cushion shackle embodying therein a substantially U-shaped element adapted to be connected to the running gear of a vehicle, a U-shaped load carrying element seated within said first named element, and adapted to sustain the load of the vehicle body, and a resilient cushion seated between said elements, said cushion comprising a plurality of rubber pads, one of said pads being of smaller dimensions than the pad engaged by either of said elements, whereby the vibrations of said running gear element are absorbed by said cushion.

In witness whereof, I have hereunto affixed my signature, in the presence of two subscribing witnesses, this 19th day of November, 1912.

ANTHONY BUONICORE.

Witnesses:
F. T. WENTWORTH,
EUGENE VON WENING.